United States Patent
Beauregard et al.

(10) Patent No.: US 7,716,572 B2
(45) Date of Patent: May 11, 2010

(54) CREATING A NEW MUSIC VIDEO BY INTERCUTTING USER-SUPPLIED VISUAL DATA WITH A PRE-EXISTING MUSIC VIDEO

(75) Inventors: Gerald Thomas Beauregard, Thomson View (SG); Srikumar Karaikudi Subramanian, Glendale Park (SG); Peter Rowan Kellock, Lakeview (SG)

(73) Assignee: Muvee Technologies PTE Ltd., The Bencoolen (SG)

(*) Notice: Subject to any disclaimer, the term of this patent is extended or adjusted under 35 U.S.C. 154(b) by 354 days.

(21) Appl. No.: 11/486,985

(22) Filed: Jul. 14, 2006

(65) Prior Publication Data

US 2008/0016114 A1 Jan. 17, 2008

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)
G11B 27/00 (2006.01)
H04N 5/93 (2006.01)
H04N 7/10 (2006.01)
H04N 7/025 (2006.01)

(52) U.S. Cl. .................... 715/223; 386/55; 725/32

(58) Field of Classification Search .................. None
See application file for complete search history.

(56) References Cited

U.S. PATENT DOCUMENTS

| 6,243,087 | B1 | 6/2001 | Davis et al. .................. 345/328 |
| 6,392,133 | B1 | 5/2002 | Georges |
| 2001/0041050 | A1* | 11/2001 | Iwata et al. .................. 386/52 |
| 2003/0078704 | A1 | 4/2003 | Partel |
| 2003/0160944 | A1 | 8/2003 | Foote et al. |
| 2003/0233929 | A1 | 12/2003 | Agnihotri |

(Continued)

FOREIGN PATENT DOCUMENTS

| GB | 2380599 | 10/2003 |
| WO | 98/31153 | 7/1998 |
| WO | WO 00/39997 | 7/2000 |
| WO | 01/18655 | 3/2001 |

OTHER PUBLICATIONS

Anynomous, The Kvikkalkul Programming Language, Oct. 1994, /http://www.cadenhead.org/book/homepage24/kvikkalkul/origin2.html.*

(Continued)

*Primary Examiner*—Pierre M Vital
*Assistant Examiner*—Jason Liao
(74) *Attorney, Agent, or Firm*—Fredrikson & Byron, P.A.

(57) ABSTRACT

A method in which a pre-existing music video (which may be a professionally-created music video) is intercut with an end-user's own additional visual data (pictures or video). In a first phase, a plurality of temporal sections are defined in a pre-existing music video. In a second phase, which may be performed by a non-professional end-user, video data specified by the end-user are intercut with the pre-existing music video according to the temporal sections.

44 Claims, 6 Drawing Sheets

U.S. PATENT DOCUMENTS

2004/0170392 A1  9/2004 Lu et al.
2005/0084232 A1* 4/2005 Herberger et al. .............. 386/4
2006/0215829 A1* 9/2006 Schwartz ............... 379/207.02
2008/0101762 A1* 5/2008 Kellock et al. ................ 386/52

OTHER PUBLICATIONS

Marc Davis, Media Streams: Representing Video for Retrieval and Repurposing, MIT, pp. 69-72.*
Audio and Video Synchronization: Defining the Problem and Implementing Solutions, 2004, Linear Acoustic, Rev 1, pp. 2-3.*
Hoskins, A Kvikkalkul to C Translator, Nov. 16, 1994 (last file date in source code), cadenhead.org, http://workbench.cadenhead.org/book/homepage24/kvikkalkul/kvik2c.html.*
SPARC Assembly Language Reference Manual, May 2002, Sun Microsystems, $1^{st}$ ed.*
Kivinen et al, Approximate inference of functional dependencies from relations, 1995, Elsevier, pp. 129-131.*

* cited by examiner

CREATING A NEW MUSIC VIDEO BY INTERCUTTING USER-SUPPLIED VISUAL DATA WITH A PRE-EXISTING MUSIC VIDEO

FIELD OF THE INVENTION

The invention relates generally to computer generation of data productions. In particular, the invention relates to automated editing of pre-existing music video by intercutting user-supplied visual data (i.e. video or image data).

BACKGROUND OF THE INVENTION

Today, media formats used by consumers are primarily digital, whether video, still images, or music. The decreasing cost of computing resources has resulted in emerging markets of casual media production. Casual user-generated video production is of particular relevance to this invention.

The main attraction of user-generated video productions is that they feature the user's own content. People are naturally interested in watching videos that show people they know personally, or shot in places and at events to which they have been.

Even with the rise in casual video production, however, there is still strong demand for professionally-edited video, such as that shown on television.

Music videos are one popular form of professionally-edited video content. A music video is "a filmed or videotaped rendition of a recorded song, often portraying musicians performing the song or including visual images interpreting the lyrics", according to the American Heritage Dictionary (on-line edition).

Music videos are highly entertaining due to the catchy music, popularity of the artists, and great production quality. One key aspect of the production process is that visual elements are synchronized to the music—transitions, effects, and of course the footage itself (lip movements synchronized to the singing, dancing timed to the music's beat).

Some casual video producers emulate some of the techniques used in professionally-edited music videos. To provide continuity and to set the mood for their productions, many casual video producers use popular music recordings as audio background, and attempt to synchronize transitions & effects in the video with strong beats in the music.

Recent years have also seen the rise of the "video mashup". A "video mashup" is a video production combining parts of various often unrelated videos to make entirely new productions.

Video mashups often use a pre-existing music video as a foundation, and "intercut" additional video material into it. Creating video mashups using conventional video editing tools requires considerable talent and effort.

A number of inventions have tried to address the problem of casual video production using computer based automatic methods.

Some inventions in the prior art focus on using a "template" to determine the structure and composition of the output production. The patent WO0039997 (Dekel Elan, Earthnoise Inc.) describes a method for automatically or semi-automatically creating "video movies" from "templates" that describe a temporal hierarchy for creating the movie. Slots in the template have associated keywords and material to fill in the slots is obtained by looking up the keywords in a video database.

The patent application US2005084232A1 (Tilman et al, Magix A G) describes a method and a user interface that presents "themed templates" with annotated slots that guide the user as to what kind of material would suit the slot's purpose. For example, a birthday template might have slots for party preparation, visitors, a shot of the cake and candles, blowing out the candles, and party wrap up. The user shoots video or pictures to fill these slots and the invention combines the user's visual data with graphics, sound effects and such elements specified in the template and creates the output production. Systems that simplify editing using templates typically have the characteristics of the inventions discussed above.

The patent U.S. Pat. No. 6,243,087 (Mark Davis et al, Interval Research Corp.) is about creating derived productions from existing media by means of a "functional dependency network" (FDN) that describes relationships between portions of input and output media. The input media is "parsed" to generate a content representation. An FDN is established that incorporates input media, content representations and other functions. The FDN is then executed to create the output production. In this case, the FDN is considered to be equivalent to a template, but the sense in which "template" is used in the two inventions above is more static than an FDN.

The patent GB2380599 (Kellock Peter Rowan, muvee Technologies Pte. Ltd.) is about automatically or semi-automatically creating an output media production from input media including video, pictures and music. The input media is annotated by, or analyzed to derive, a set of media descriptors which describe the input media and which are derived from the input media. The style of editing is controlled using style data which is typically specified by the user. The style data and the descriptors are then used to generate a set of operations on the input data, which when carried out result in the output production. This step incorporates techniques that can be taken as capturing a human music video editor's sensibilities—resulting in a production where the editing, effects and transitions are timed to an input music track. Since no significant constraints are placed on the input media and most of the tedious operations are automated by computer means, it presents a least effort path for the average camcorder/camera user to create an enjoyable stylish production. The commercial product by muvee Technologies named muvee autoProducer™ is based on the above invention.

SUMMARY OF THE INVENTION

The present invention aims to provide new and useful techniques, systems and software for automatic creation of an audio-visual output production.

In general terms, the invention proposes that a pre-existing music video (which may be a professionally-created music video) is intercut with a user's own additional visual data (pictures or video). In a first phase, a plurality of temporal sections are defined in a pre-existing music video. In a second phase, which may be performed by a non-professional end-user, video media specified by the end-user are intercut with the pre-existing music video according to the temporal sections Preferred embodiments of the invention make it possible for video enthusiasts to create their own video mashups—or "personalized music videos"—with far less effort than if they were to use conventional video editing tools.

Note that the present invention relates to creating new music videos based on a pre-existing music video composition. The user's own video and pictures when used in combination with the pre-existing music video according to the methods laid out in this document, may result in a production that gives the illusion that the user's material has been an integral part of the process of creating the original work. The term "intercutting" is used to describe the said combination process.

Combining the user's video and pictures with an existing music video requires new methods that crucially differentiate the present invention from the others referenced above. Prior art techniques which use "templates" (WO0039997, US2005084232A1) provide no methods to automatically create output with the music track of an input music video and where the user's material is combined with the pre-existing music video in accordance with characteristics of the visual part of the music video as well as characteristics of the music. The present invention, unlike the template-based inventions, does not necessitate fixed "slots" into which user's media are placed. Further, a template completely specifies the structure and style of the output, whereas the present invention provides methods that may result in significant variations even given the constraint of using the input music video as the underlying structure of the output. Therefore the present invention differs significantly from those requiring templates.

One key difference between the present invention and GB2380599 is that the latter has no provision for maintaining synchronization between portions of any input video that are used in the output production and the music track to which those portions of video were synchronized in the input video.

Regarding U.S. Pat. No. 6,243,087, the methods of the present invention can be thought of as part of a "functional dependency network" incorporating the input music video and user media. However, any computer based method to generate a class of outputs from a class of inputs is in general equivalent to an FDN description and is therefore too general a description. Such general FDNs can also be found in other systems such as the "Max" graphical environment for music composition. In the more specific context of using an input music video, the methods of the present invention are novel compared to those described and claimed in U.S. Pat. No. 6,243,087.

Optionally, by making use of additional style data, the appearance and feel of the pre-existing music video can be dramatically altered in various ways to create variant productions based on the same material. The original work is thus personalized using the user's own media and choice of style.

Nomenclature

For purposes of the present invention, various terms or nomenclature used in the art are defined as follows:

The term "music video" is used herein in its common, everyday sense, namely an audiovisual production for which the audio part consists of a piece of music, and in which the editing of visual data is synchronized to that music. Typically, a music video is "a filmed or videotaped rendition of a recorded song, often portraying musicians performing the song or including visual images interpreting the lyrics" (from American Heritage Dictionary).

The term "pre-existing music video" refers to a previously-created music video which is used as one of the inputs to the present invention. The pre-existing music video in most cases would be a professionally-produced music video.

The term "new music video" refers to the music video generated as a result of using the methods described in this patent. We also refer to this as the "output production".

The term "additional visual data" refers to pictures and/or video files supplied to the system by the end-user.

The term "input media" refers to the entire collection of media files from which the output production is created. This includes the pre-existing music video and the additional visual data, supplied by the user.

The term "temporal section" refers to a particular portion of a video, defined by a time range. A temporal section typically has a duration that is greater than zero (i.e. its end time is greater than its start time), and less than the duration of the video of which it is a part. Temporal sections with durations equal to zero or with durations equal to the full duration of the video are valid, yet trivial extreme examples. A temporal section typically has a duration that is greater than zero (i.e. its end time is greater than its start time), and less than the duration of the video of which it is a part.

The term "location data" refers to the temporal boundaries (i.e. start and end times) for one or more temporal sections.

The term "modifiable section" refers to a temporal section in the pre-existing music video defined during the annotation phase, and for which at least one type of modification has been specified.

The phrase "type of modification" refers to a particular way in which a section of video may be modified using additional visual data. The simplest modification is replacement, i.e. a temporal section of the pre-existing music video is replaced by additional visual data, however there are other types of modification which use both pre-existing music video and the selected additional visual data.

The term "segment" refers to a temporal section of video that is contiguous, i.e. with no intervening transitions.

The term "transition" refers to the behaviour at the temporal boundary between successive segments in a production. An instantaneous zero-duration transition from one segment to another is known as a "cut". Transitions with non-zero duration, used where successive segments have temporal overlap, include dissolves, wipes, and numerous other transitions that are well-known to those skilled in the art.

The term "style" refers to a video editing style in the sense used in muvee autoProducer and in UK Patent GB2380599, with some extensions. The style describes the the kinds of editing operations that may be performed on the input media to create an output production, and may also include the pre-existing music video (or a reference to it) and annotation information for that pre-existing video.

The term "style author" refers to a person (or persons) whose role is to annotate the pre-existing music video, in cases where such annotation is done manually or semi-automatically.

The term "edit decision list" (EDL) refers to a data structure, or its equivalent representation in a file, which specifies what media to play at a given instant in the output production as well as the effects and transitions that should be used.

The term "operating" a computer system includes both a user operating a computer system which is physically proximate a user, and also operating a computer system remotely, e.g. by supplying commands over the internet. For example, the computer system operated by an end-user may a server system operated by many respective end-users to produce respective output productions.

BRIEF DESCRIPTION OF THE FIGURES

Preferred features of the invention will now be described, for the sake of illustration only, with reference to the following figures in which.

DESCRIPTION OF THE PREFERRED EMBODIMENT

Figure 1:
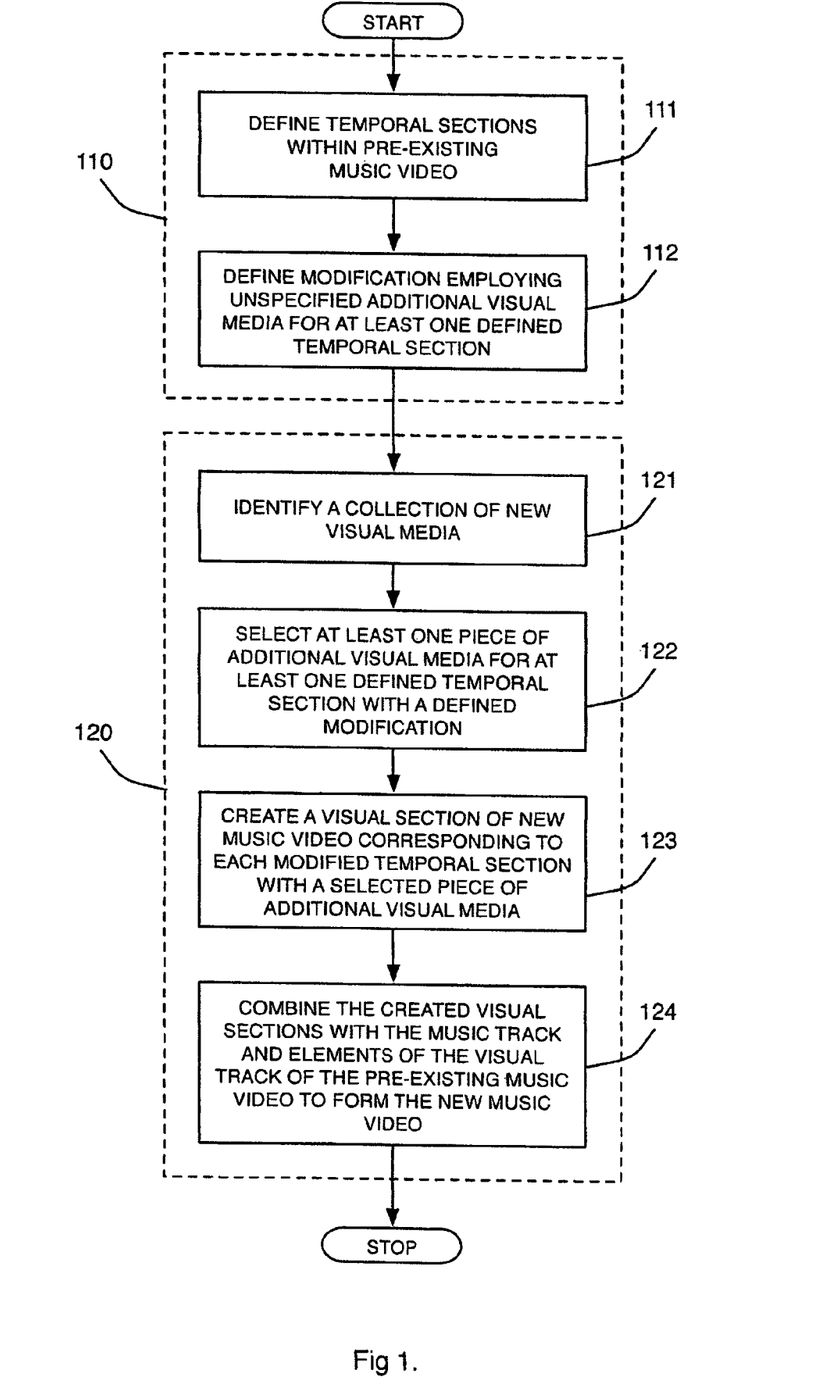
FIG. 1 is a flow chart summarizing the steps of a method which is an embodiment of the invention to generate a new music video from a pre-existing music video and additional visual data.

FIG. 1 is a flow chart summarizing the steps of a method which is an embodiment of the invention to generate a new music video from a pre-existing music video and additional visual data. The method has two phases, annotation 110 and creation 120, each comprising several steps.

In the first phase 110, the pre-existing music video is annotated with information that will guide the creation of the new music video in the second phase. Typically, the first phase is performed by one or more first users (for example, associated with a commercial organisation supplying a music video) and the second phase is performed by an end-user.

The annotation phase has two steps. In the first step 111, temporal sections are defined within the pre-existing music video. These temporal sections may be modified with additional visual data, which is supplied by the first user in the creation phase 120. The temporal sections may cover the entire duration of the pre-existing music video, or only parts of it. (In most cases, the temporal sections will be non-overlapping; if the EDL (Edit Decision List) which was used to produce the pre-existing music video is available, however, and the temporal sections correspond to segments in the pre-existing music video, the temporal sections may overlap at transitions.)

In the second step 112 of the annotation phase, one or more types of modification to be applied to each of the temporal sections are specified. The types of modification could be as simple as replacing the temporal section with user media, or they may be more complicated, for example a "picture-in-picture" modification in which additional visual data is presented in a rectangle within a frame which otherwise shows the pre-existing music video.

In the second phase, creation 120, a new music video is created using additional visual data supplied by the end-user taking into account the annotations created in phase 1. The creation phase has several steps.

In the step 121, the end-user indicates a collection of additional visual data. For example, if the method were implemented on a personal computer, the end-user might select one or more video files and/or pictures files through a file selection dialog box. In the step 122, elements of the additional visual data are selected for use in modifying the temporal sections defined in step 111. Additional visual data may not necessarily be selected for every temporal section; it may be that elements of the additional visual data are selected for only a subset of the temporal sections. For example, the selection step may be such that additional visual data must never be repeated, in which case if the pool of additional visual data is limited, it may be impossible to selected additional visual data for every segment.

In the step 123, for each temporal section for which elements of the additional media have been selected in step 122, one or more of the specified types of modifications for the section as specified in step 112 are actually performed. For temporal sections where more than one type of possible modification was specified in 112, it is not necessary that all those modifications be performed. For example, if two possible modifications were specified, step 123 may use only one of them depending on the characteristics of the selected media, e.g. if it has high-motion, step 123 may use modification A, whereas if it has low-motion, step 123 may use modification B.

In step 124, the modified sections are combined with other sections of the pre-existing music video and the music track of the preexisting music video to form the new music video. This combining would typically be done by constructing an EDL (Edit Decision List) which specifies what media to play at a given instant in the output production as well as the effects and transitions that should be used.

Manual, Automatic, or Semi-Automatic Annotation

The creation phase 120 is automatic apart from step 121 in which the end-user indicates a collection of additional visual data. The annotation phase 110, however, can be fully manual, fully automatic, or semi-automatic.

For cases in which the annotation in phase 110 is done manually or semi-automatically, the user performing the annotation will henceforth be referred to as the "style author" to distinguish him or her from the user supplying additional visual data in the creation phase 120. Note that the "style author" could be the same person as the user in creation phase 120, but is not necessarily the same person. Furthermore, the tasks performed by the style author could in fact be split among several people. For the sake of simplicity, in descriptions that follow, "style author" should be taken to mean one or more people involved in any manual steps of the annotation phase 110.

Some manual annotation steps could take place during the production of the pre-existing music video. As mentioned earlier, the temporal sections defined in step 111 could correspond to segments in the pre-existing music video, as defined by its EDL. The editor or producer of the pre-existing music video might additionally create information specifying:

which temporal sections are modifiable, and which are not;
the modification priority;
the types of modifications that may be used (e.g. replacement, picture-in-picture); and
additional effects that should be applied to end-user visual data (for example, colorization effects to make the end-user's visual data match effects used in the production of the pre-existing music video.

Depending on the editing tools used to create the music video, such additional information could be embedded into the EDL itself, or stored in a separate data file.

Effects & Transitions

The EDL may include additional effects beyond those in the pre-existing music video. Here are a few of the ways in which additional effects might be used:

Effects may be applied to selected portions of the end-user-supplied additional visual data so they better match the sections of the pre-existing music video which they modify or replace. For example, if the preexisting music video had a "scratchy old film" effect, a similar effect could be applied to the end-user-supplied additional visual data.

A single effect may be applied over the entire duration of the new music video in order to give the portions of the pre-existing music video and end-user-supplied additional visual data a similar look. For example, the pre-existing music video and the end-user-supplied additional visual data may both be in full colour, but nonetheless be readily distinguished because of the characteristics of the lighting used to shoot them. By applying an effect that converts the output to the grey-scale, such differences in colouring disappear.

Additional music-driven effects may be applied, for example, white flashes or quick zoom-ins triggered on strong beats in the music.

A slow-motion effect could be applied to varying degrees to match any slow-motion effects used in the pre-existing music video. (The same of course could apply to fast-motion effects).

Parameters for such effects could be determined manually or automatically. For slow-motion effects, for example, the degree of slow-motion to apply to selected portions of end-user-supplied additional visual data could be determined in one or more of the following ways:

If a style author has manually defined the modifiable temporal sections of the pre-existing music video, he or she might also manually note the degree of slow-motion for those sections;

If the EDL for the pre-existing music video is available, the degree of slow motion could be read directly from that EDL;

The degree of slow-motion could be estimated by automatic analysis of the pre-existing music video, for example, by estimating the total amount of motion from frame-to-frame;

In music videos, slow-motion is typically used more when the music is soft, and less when the music is loud. A degree of slow-motion to apply could therefore be determined by analyzing the music track to find the loudness of the music during the temporal sections that will be modified, and mapping that loudness to degree of slow-motion.

The EDL may include additional transitions which are not merely cuts (though they may include cuts) that were not present in the pre-existing music video:

If a temporal section of the pre-existing music video is replaced with more than one portion of additional visual data, a transition which is not merely a cut may be used between those portions.

Transitions other than merely cuts may be used between selected portions of additional visual data and unmodified sections of the pre-existing music video.

In the simplest case, all the transitions would be cuts, however any other type of transition may be used wipes, dissolves, and other transition types known to those familiar with video editing.

If multiple transition types are used in a single production, they may be selected cyclically from a list of possible transitions, for example using the "value cycles" as described in UK patent GB2380599.

The durations of the transitions may be fixed, or variable. In the case where the transition duration is variable, it is often desirable to have the transition duration vary as a function of music loudness: where the music soft, the transitions are longer; where it is loud, the transitions are shorter. In a simple implementation, if the loudness descriptor is a normalized value in the range 0 to 1, the duration for a particular transition could be computed based on the loudness at that point in the song as follows:

$$TransDur = MaxTransDur - (MaxTransDur - MinTransDur) \times Loudness$$

where MaxTransDur is the maximum transition duration, to be used when the music is at its softest (i.e. Loudness=0); MinTransDur is the minimum transition duration, to be used when the music is at its loudest (i.e. Loudness=1); and TransDur is the duration for a particular transition.

Preserving Synchronization

Preferably, the sections of the pre-existing music video that are used in the new music video have the same timing relative to the music track as they did in the pre-existing music video. In other words, whatever was synchronized with the music in the preexisting music video—for example, a singer's mouth and body as she sings and dances—is also synchronized with the music in the new music video.

Saving & Sharing

The EDL may be rendered to a video file, possibly in compressed form. Once rendered to a video file, the new music video could be distributed and used in numerous ways. For example, the video file could be emailed or sent via an "instant messenger" application to another computer. The video file could be made available on a web site for viewing and/or downloading by visitors to that web site. The video file could be transferred to a portable video playback device such as an Apple iPod or Sony PSP (Playstation Portable), or transferred to a mobile phone for use as a video ringtone. The video file could also be transferred to other physical media such as a VCD (Video CD) or DVD for later playback on devices that can play such media.

Alternatively, the EDL could be rendered in real-time, for immediate playback on the computer on which it was created. The EDL and the media files to which it refers (or portions thereof) could be sent to another computer or device for rendering, either for real-time playback, or to save into a video file.

Annotation and Creation by Different Parties

It is important to note that in the annotation phase 110, no "editing" takes place. No additional visual data is introduced, and the pre-existing music video does not undergo any actual modification. The annotation specifies only types of editing operations which might take place, and the temporal ranges to which they might apply, but does not actually perform those operations.

All the operations that would normally be regarded as video editing take place in the second phase, creation 120. The entire first phase 110 can in fact be performed without any knowledge whatsoever regarding the additional visual data. This means that the two phases 110 and 120 are somewhat independent.

While the two phases could all be performed on a single computer, with a single user, in a single relatively short session (e.g. within the span of a few seconds or minutes), this is not a requirement. The two phases 110 and 120 could be performed on different computers; any steps in the two phases that require manual intervention could involve different users; and the two phases could be performed at very different times, even years apart, provided that the annotation phase 110 always precedes the creation phase 120. Different computers may be used for any of the substeps as well. For example, if the annotation phase involves analysis of the media, as described below, that analysis may be performed on a different computer from other steps in the process.

In a preferred embodiment, the first phase 110 would be performed ahead of time, typically manually or semi-automatically by or with the assistance of an experienced video editor. The combination of the pre-existing music video and the annotation could be packaged in a "style". The style may also include other information or settings that determine how new music videos are to be created, for example specification of additional effects or transitions to apply according to methods described below.

An end-user would then use that "style" and his own additional visual data with a computer program that implements the creation phase 120 to create new music videos—"personalized music videos" or "video mashups". Such a computer program may include means to choose one of many different styles for a given production. By choosing different styles, the end-user could thus create many different new music videos in many different styles from the same set of additional visual data.

For a given pre-existing music video, the annotation phase 110 may be performed once, but the resulting style could be used in the creation phase 120 by many end-users to create a large number of new music videos.

Manual Determination of Temporal Sections

As mentioned above, in step 111 the temporal sections are defined within the pre-existing music video. This can be done fully manually, fully automatically, or semi-automatically.

In the fully manual case, the style author views the pre-existing music video with a video playback program or device, and manually notes start and end times of sections of the pre-existing music video which could be replaced.

Typically the style author would choose boundaries for the temporal sections that correspond to boundaries between segments in the pre-existing music video. In other words, the start & end times of temporal sections fall on transitions in the pre-existing music video.

Any portions of the pre-existing music video that are not included in the set of defined temporal sections will not be modified through combination with (or in the simplest case, replacement by) additional end-user-supplied visual data in subsequent steps. Such portions, by virtue of not being included in the set of modifiable sections, can be thought of as being in effect "locked". Such locking of portions of the pre-existing music video could be used by the style author to guarantee that certain portions of the pre-existing music video which are critical to the music video's story or narrative remain in the new music video, or that particularly iconic or memorable shots of the artist always appear. Note that such locking can also be done to some extent automatically based on certain heuristics about what portions of the pre-existing music video are most likely to be especially important.

In cases where the EDL used to create the pre-existing music video is available, the task of selecting suitable boundaries for the temporal sections is considerably easier, as the transition times can be read directly from the EDL file. (If the EDL format is proprietary or not human-readable, the times can be determined by opening the EDL file using the video application which generated it, and by manually reading the transitions times in that application's user interface).

Aligning the start and end times of temporal sections with transitions in the pre-existing music video is not an absolute requirement. The temporal sections could, for example, span multiple segments of the pre-existing music video, or cover only portions of segments of the pre-existing music video.

Automatic Determination of Temporal Sections Using Analysis

The temporal sections may also be determined fully automatically based on descriptor data obtained by analyzing the video and or audio components of the pre-existing music video.

Figure 2:
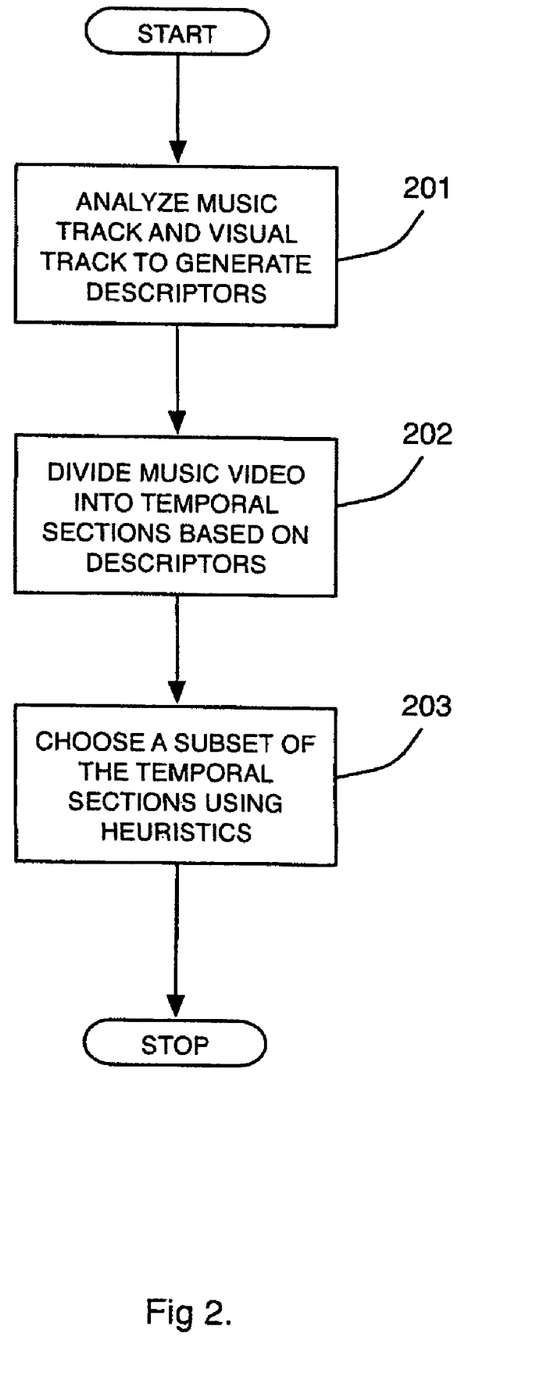
FIG. 2 is a flow chart showing steps of a possible implementation of one step of FIG. 1, for automatically determining temporal sections for a pre-existing music video.
Figure 3:
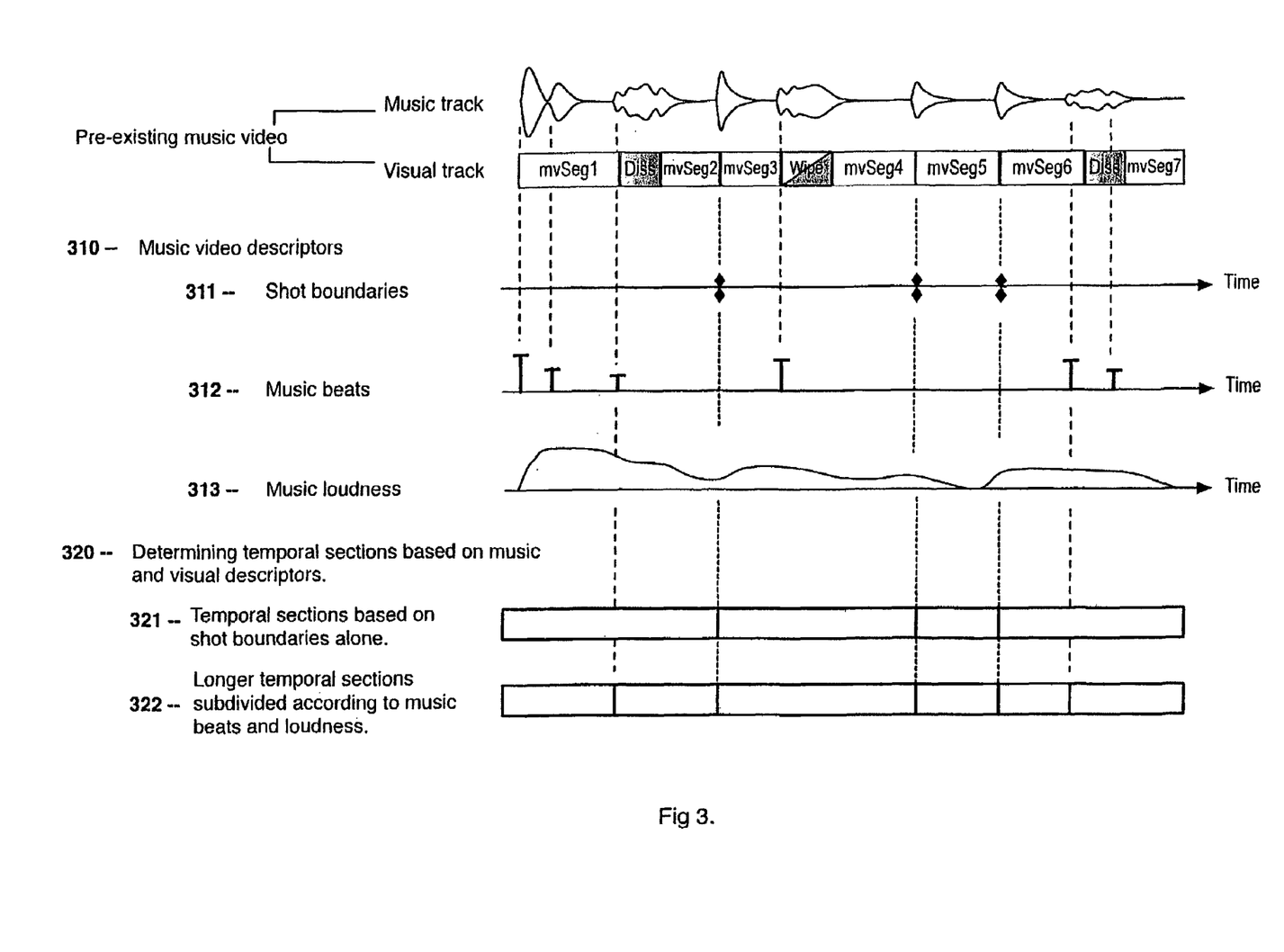
FIG. 3 illustrates how music and video descriptor data may be used in one step of FIG. 2 to obtain location data for the temporal sections.

A preferred way of automatically determining the temporal sections is shown in the flowchart FIG. 2; it can be considered one possible expansion of step 111 of FIG. 1. Details of FIG. 2 are further illustrated in FIG. 3. The upper two rows of FIG. 3 show respectively the music track (illustrated schematically by an amplitude graph) and the associated visual track. As indicated, the visual track has a number of different pre-existing sections defined by the EDL which was used to produce it.

In step 201, the music and visual tracks of the pre-existing music video are analyzed to generate descriptors 310, which are indicated individually in rows 311, 312 and 313. For the purposes of the preferred embodiment, the descriptors that are of most interest are the times of the transitions in the video track, in particular the shot boundaries 311; times of prominent beats in the music track 312; and the loudness of the music track as function of time 313. Techniques for determining such descriptors are well known to those skilled in the art.

In step 202, the pre-existing music video is divided into temporal sections, based on information in the descriptors. This is illustrated by the portion of FIG. 3 starting with the row labelled 320, with two possible definitions of temporal sections being shown in the rows labelled 321 and 322. The most natural boundaries for the temporal sections would be during transitions between segments in the pre-existing music video, particularly if those transitions are shot boundaries (i.e. cuts) 311 in the pre-existing music video. Detecting arbitrary transitions through analysis is quite difficult and unreliable, however, so the video descriptor 311 showing detected transition times may not indicate all the actual transition times. The temporal sections 321 determined by the detected transition times alone may therefore be longer than ideal.

If the temporal sections are too long, we can use the music descriptor data 312 as "cut hints" to subdivide the temporal sections 321 into subsections that are closer to the desired duration. For any temporal section whose duration exceeds a threshold duration, we subdivide the temporal section using the strongest cut hint occurring near the middle time of the temporal section, as shown in row 322. This subdivision is repeated until the duration of every temporal section is less than or equal to the threshold duration.

In a preferred embodiment of this technique, the duration threshold varies depending on the music loudness 313. In professional-produced music videos the pacing of the editing generally varies with the loudness of the music; in particular, the segments are shorter when the music is loud, and longer when the music is soft. In order to create the most aesthetically pleasing new music videos from a pre-existing music video, it's desirable to have temporal sections whose durations vary according to the loudness of the music. In the subdivsion process described above, for each temporal section, we check to see whether subdivision is necessary by comparing its duration with a threshold duration that's a function of the average loudness over the course of the temporal section.

For example, suppose the music descriptor contains a measure of instantaneous loudness, normalized into the range [0,1], that is, the softness parts of the music are assigned a loudness value of 0, while the loudest parts of the music are assigned a loudness value of 1.0. Suppose duration threshold for the loudest and softest parts of the music are minDurThresh and maxDurThresh; parts of the music with intermediate loudness have loudness values somewhere between 0 and 1.

The duration threshold used in determining whether a given temporal section should be subdivided could be computed as follows:

DurThresh=MinDurThresh+(MaxDurThresh−MinDurThresh)(1−AvgSectionLoudness)

(In most cases, the temporal sections will be non-overlapping; if the EDL for the pre-existing music video is available, however, and the temporal sections correspond to segments in the pre-existing music video, the temporal sections may overlap at transitions.)

Once we have temporal sections covering the entire duration of the pre-existing music video, we can choose a subset of the sections in step 203. Temporal sections not included in this subset will not be modified. Various heuristics can be used to choose a suitable subset of temporal sections.

Choosing a Subset of Temporal Sections

Figure 4:
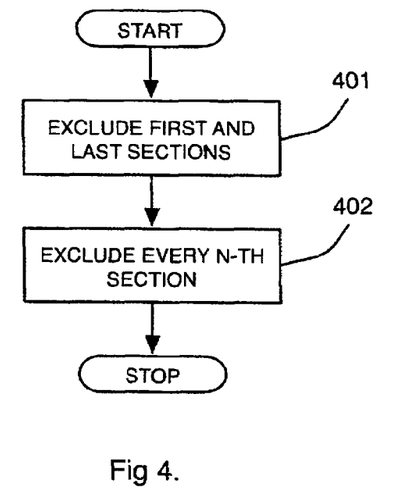
FIG. 4 is a flow chart of the sub-steps of a step of FIG. 2, for obtaining a subset of temporal sections for which a possible modification will be specified.

FIG. 4 is a flow chart that illustrates the steps for the preferred embodiment of a heuristic method for choosing a subset of temporal sections, which could be performed manually or automatically. It is one possible expansion of step 203 in FIG. 2. Often in music videos, the first and last segments are particularly important, as they give the first & last glimpse of the artist or band shown. In a personalized music video, it is desirable to include these segments in order to clearly tie the personalized music video to the pre-existing one upon which it is based. In step 401, we therefore exclude the first and last temporal sections from the list of modifiable sections; these sections will therefore not be modified through combination with the additional end-user-supplied visual data. For the remainder of the personalized music video, it is desirable to alternate between the pre-existing music video and additional visual data specified by the user. A simple way to guarantee this is to exclude every $2^{nd}$ (or more generally, every nth) temporal section from the list of modifiable sections as in step 402. Conversely, one could include every nth temporal section.

Note that resulting list of temporal sections specifies temporal sections that may be modified. Another way to look at it is that any time-ranges in the pre-existing music video that are not covered by temporal sections in this list are in effect "locked"—they will not under any circumstances be modified using end-user-supplied additional visual data in any later steps.

Other heuristics could be used as well. For example, a random subset of temporal sections could simply be chosen randomly from the full set of temporal sections, subject to the condition that percentage of temporal sections that is included in the subset falls within a certain predefined range; or alternatively, subject to the condition that the sum of the durations of the temporal sections in the subset accounts for some fraction of the total duration of the pre-existing music video.

The subset of temporal sections could also be chosen automatically based on descriptors obtained through analysis of the video and/or music of the pre-existing music video. Such descriptors and techniques for obtaining them automatically through analysis are well-known to those skilled in the art. Ways in which descriptor information could influence which temporal sections are chosen include:

Defining for possible modification temporal sections of the pre-existing music video that are particularly dark.

Defining for possible modification temporal sections of the pre-existing music video where the music is especially loud.

Defining for possible modification temporal sections of the pre-existing music video where no close-ups of faces are detected.

Semi-Automatic Determination of Temporal Sections

In the semi-automatic case, the video and/or music tracks of the pre-existing music may be analyzed automatically to generate a list of suggested start & end times for temporal sections. The style author may create temporal sections with start/end times taken from this list or use any other times which the style author believes are more appropriate.

Alternatively, a fully automatic method may be used to suggest a set of temporal sections, and a style author could simply confirm or reject the suggested set. If the automatic method for generating a set of temporal sections has some random element, the style author could repeat the automatic generation until a particular good set of temporal sections is generated. (What constitutes a "good" set of temporal sections is an aesthetic judgement, and probably cannot be fully quantified; if it could be fully quantified, there would be no need to consider manual or semi-automatic methods for determining the temporal sections).

While the annotation phase may allow specification that certain editing operations must be performed, this is not absolute requirement. For example, the annotation may allow that only a subset of the temporal sections gets modified, the size of that subset depending on the amount of additional visual data available in the second phase 120.

Modification Types

Several types of modification of temporal sections are possible, including:

Replace: a section of the pre-existing music video is replaced with selected additional visual data. This is the simplest type of modification.

Occlude: a section of the pre-existing music video is fully covered by selected additional visual data. The visual result is identical to the Replace case, but the EDL structure will be different.

Picture-in-Picture: during a section of the pre-existing music video, selected additional visual data is displayed in a small rectangle with the frame. The converse is also possible: selected additional visual data is shown in the frame, and the pre-existing music video is displayed in a small rectangle within that frame.

Split-screen, e.g. additional visual data is shown on the left half of the frame, the pre-existing music video on the right half.

Multi-faceted 3D object, for example a spinning-cube. The pre-existing music video is shown on one or more faces of a spinning cube, selected additional visual data shown on one or more other faces.

Picture-in-Picture, Split-screen, and Multi-faceted 3D objects can all be considered examples of spatially-combining the pre-existing music video with the user-supplied additional visual data.

Specifying Modification Types and Priorities

Figure 5:
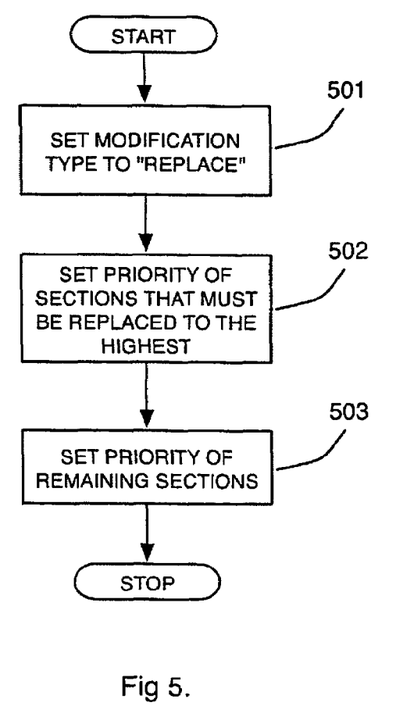
FIG. 5 is a flow chart showing a possible implementation of another step of FIG. 1, for specifying a fixed modification type with varying priority for each temporal section.

FIG. 5 is a flow chart illustrating steps for specifying modification for temporal section of a pre-existing music video. It is a preferred embodiment for step 112 of FIG. 1, for the case when the annotation phase is performed manually.

In step 501, the modification type for all temporal sections is set to "Replace". As described above, there are various ways that temporal sections of the pre-existing music video could be modified using selected additional visual data. Replacement is the simplest and most straightforward of these possible types of modification. One could alternatively use "picture-in-picture", "split-screen", or other modifications. There's no requirement that the modification type be the same for all temporal sections; different sections could use "Replace", "Picture-in-Picture", "Split-screen", or other types of modification all within a single production.

In step 502 and 503, the replacement priorities for the sections are set. The priorities could be represented by a number in the range 0 to 1, where 1 indicates "must replace", indicates "must not replace", and values in between indicate "optionally replace" (e.g. depending on the amount of additional visual data that is available).

In step 502, the priority for temporal sections that must be replaced is set to the highest possible value. In step 503, the priority for the remaining temporal sections is set. If it is clear what the desired priority is, the priority for each temporal section could be set carefully and explicitly, with higher values to high priority segments, and lower values for low priority segments. If there is no very clear order, the priorities could all be set to some fixed value greater than 0 and less than 1 (for example, 0.5), or set to pseudo-random values in that range.

Specification of the modification type and priority for the temporal sections could also be performed automatically using a variety of heuristics, and optionally using descriptors obtained through automatic analysis of the pre-existing music video.

For example, suppose in step 111 we have defined temporal sections the sum of whose durations accounts for 50% of the total duration of the pre-existing music video. We may require that at least 50% of those be "must replace" sections; this would guarantee that in the new music video, at least 25% of the pre-existing music video gets modified with end-user-supplied additional media. It would be undesirable if that 25% were entirely within the first part or last part of the new music video; to avoid that possibility, we could ensure that the "must replace" sections are evenly distributed throughout the set of modifiable sections, rather than clumped up at the beginning or end.

Determination of the modification priority may also be done automatically based on analysis of the visual and/or audio content of the pre-existing music video. For example:

Through video analysis, it is possible to determine which temporal sections of the pre-existing music video are less likely to contain closeups of faces. Such sections may be considered better candidates for replacement with end-user-supplied additional visual data, and hence be automatically given higher priority for replacement. This is on the assumption that closeups in the pre-existing music video are likely to be of the artist featured in that music video, and that end-users will want to see the artist in the personalized music videos they create.

Through audio analysis, it is possible to estimate which sections are more likely to include a singer's voice, and which sections are purely instrumental. Sections that are more likely to include a singer's voice may be given lower priority for replacement—on the assumption that the singer is more likely to be visible in sections where he/she is singing, and that end-users will want to see the singer in the personalized music videos they create.

Analysis of the pre-existing music video may also be used to determine the modification type. For example:

During instrumental sections of the pre-existing music video (i.e. where there's no singing), the modification type may be set to "replace", whereas during portions where there's singing, a "picture-in-picture" modification may be used such that the pre-existing music video continues to be visible in a small rectangle superimposed on user-supplied visual data.

Selection of End-User-Supplied Additional Visual Data

Figure 6:
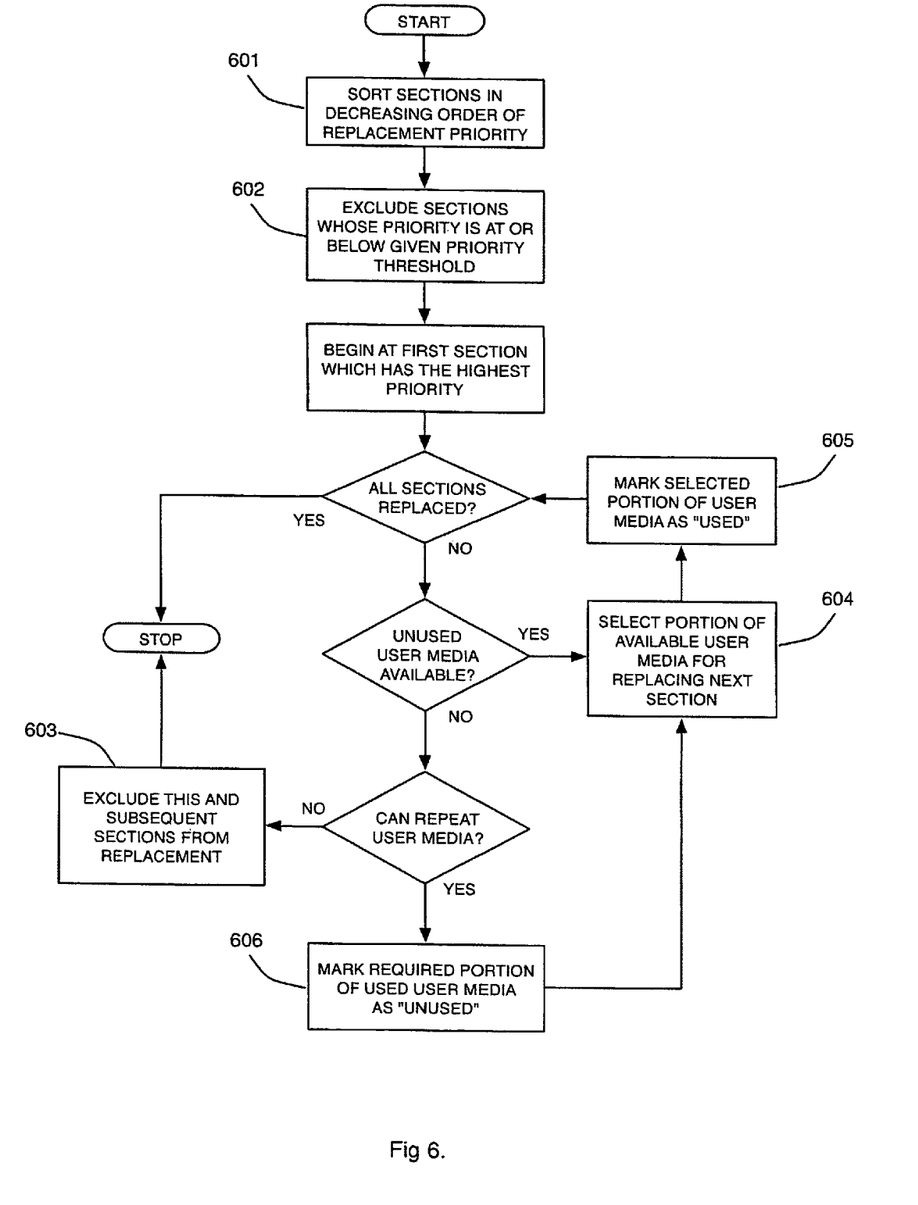
FIG. 6 is a flow chart showing a possible implementation of another step of FIG. 1, for selecting an ordered subset of temporal sections for replacement using priority.

FIG. 6 is a flow chart illustrating a preferred embodiment of the step 122 in FIG. 1, namely the step of selecting additional visual data for at least one of the temporal sections.

In step 601, temporal sections are sorted in decreasing order of replacement priority. This results in a sorted listed in which sections with the highest priority for replacement (e.g. "must replace" sections) are at the start of the list, and sections with lowest priority are at the end. In step 602, sections whose priority is at or below a given priority threshold are excluded, i.e. removed from the list. This step is provided so that the number of sections that get replaced can vary from one production to another, for example based on a user control that sets the balance between the fraction of the production that will consist of end-user-supplied addition visual data versus the fraction that will consist of sections from pre-existing music video.

Starting from the highest priority section, as long as there are sections to be replaced and unused end-user-supplied additional media, in step 604 a portion of that visual data is selected to replace the next section (in descending order of priority), and the selection portion of end-user-supplied visual data is marked as "used" in step 605. If there is no more unused end-user supplied media, and if media is allowed to repeat, then in step 606 a required already-used portion of the end-user-supplied additional visual data is marked as unused, so the loop of repeatedly selecting portions of end-user-supplied additional visual data can continue. If user media cannot be repeated, then the current section and all subsequent sections (in descending order of priority) are left unmodified, and excluded from replacement step 603.

Descriptor Matching

In a preferred embodiment, step 604 may use "descriptor matching" in which user media is selected such that it has characteristics closest to some target descriptor values. Some descriptors may be "global", e.g. perhaps for a particular style or particular production, we want to emphasize faces, regardless of the original content of the modifiable sections. In other cases, the characteristics of the media to select could vary from segment to segment.

Style author may manually specify target descriptors for segments to be replaced.

Target descriptors for a modifiable segment may be derived automatically based on analysis of the portion of the music video that originally occurred at that point in the music.

Target descriptor may be based on what is happening in the music at that point. E.g. where the music loud, choose bright video or pictures, where it is soft, choose dark video or pictures.

If the end-user-supplied additional media includes video, and we have analyzed that video to determine the shot boundary times, in step 604 for a given modifiable section we could preferentially choose portions of the end-user-supplied media that are at least as long as the modifiable section. In this way, the new music video is less likely to have shot boundaries that are uncorrelated with the beats of the music.

Other methods for selecting media based on descriptor matching are described in the prior art, for example in UK patent GB2380599.

In step 121 in which the end-user identifies a collection of new visual data, the user-interface may also include controls whereby the user can specify preference levels for portions of the user media, thus specifying how important it is for him or her that various portions of the new visual data be included. For example, if the new visual data includes video, the end-user might specify "highlights", portions of the video that he or she would very much like to see in the new music video, or "exclusions", portions of the video that should not appear in the new music video.

If such information about the end-user's preferences for the user media is available, it can be taken into account in step 604. When selecting a portion of the available user media for to replace a section, first priority would go to portions the user has indicated as "highlights", and "exclusions" would be avoided entirely.

The various criteria described above for selecting user media may at times be in conflict. For example, the user may have highlighted a portion of his or her video that is in a shot that's shorter than any of the sections which must be replaced. One possible approach to selecting media in face of such contradictory criteria is to use a scoring model whereby each of the criteria has a given weight that determines its influence on the selection decision. We could, for example, set the weights such that highlighted portions of the end-user-supplied media always make it into the new music video, even if this results in some temporal sections getting replaced with user-media that contains shot boundaries.

In the above description, the selection of portions of end-user-supplied media is done for one temporal section at a time. For each temporal section, we find the best portion of end-user-supplied media, without taking into account how this may affect the selection of media for subsequent temporal sections. An alternative approach is to use an algorithm that finds a globally optimal (or near-optimal) set of user selections for all temporal sections simultaneous, according to some scoring model that defines how good a given set of selections is based on how well the descriptors match, whether it avoids shot boundaries in the user video, and whether it includes all user-specified highlights. Numerous programming techniques for solving global optimization problems are described in the literature, including simulated annealing, dynamic programming, and genetic algorithms.

Deferred Decision of Modification Type

The type of modification to use for each temporal section may be partially or entirely deferred to the second phase, rather than being determined for each temporal section entirely during the annotation phase.

For example, during the annotation phase, for each temporal section a list of possible modification types may be specified for each segment, with conditions associated with each type of modification. For example, for a given temporal section, the modification type could be "replace" only if the selected user visual data is high-motion video; if the selected user visual data is a still image or low-motion video, the modification type would be picture-in-picture, with the user visual data appearing in a rectangle superimposed on the pre-existing music video.

Segment Replacement Example

Figure 7:
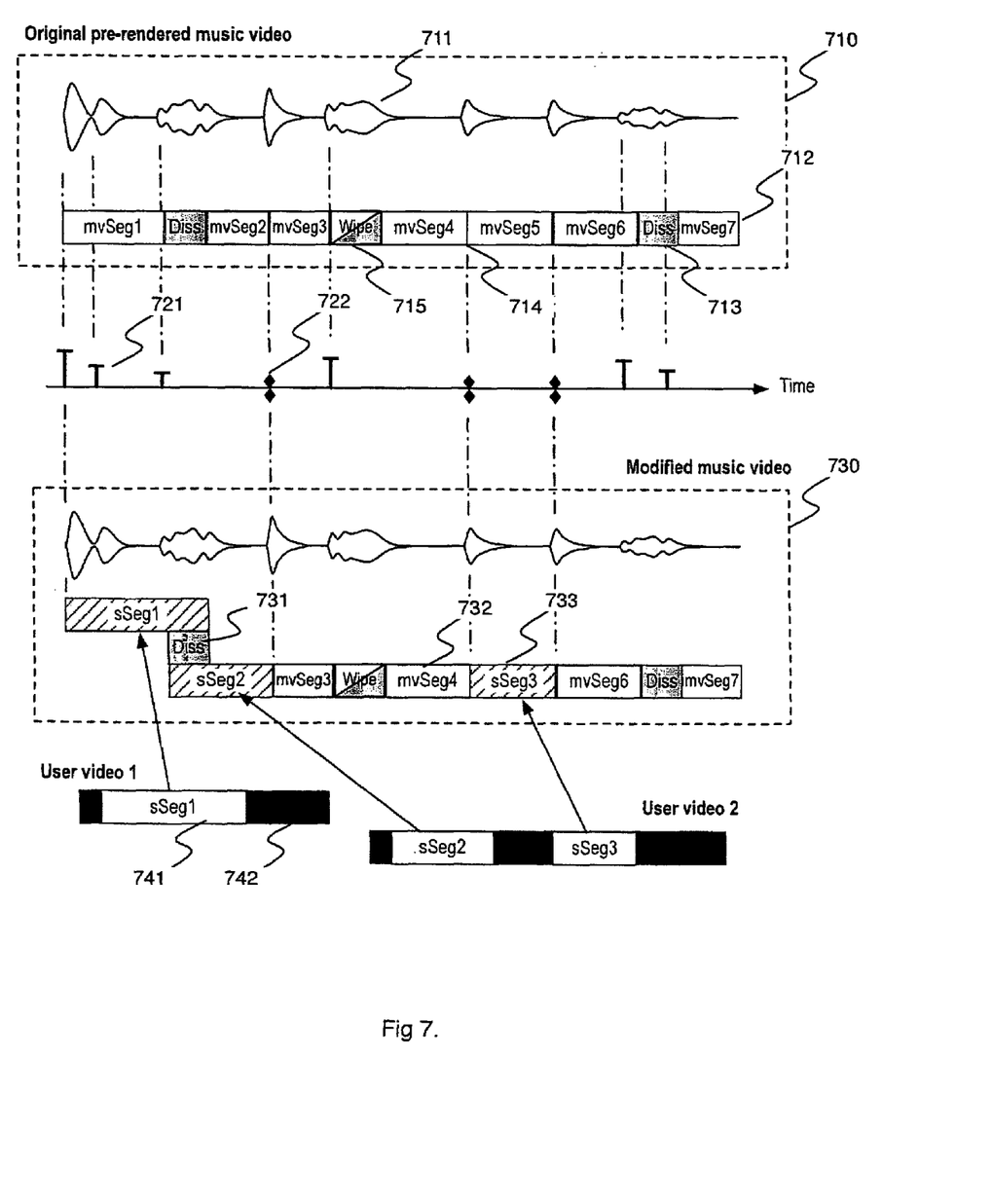
FIG. 7 is an schematic illustration of the operation of the embodiment.

FIG. 7 illustrates the overall operation of the embodiment for segment replacement in a pre-existing music video using analysis of music and video. The assumption here is that the "edit decision list" (EDL) for the pre-existing music video is not available, nor is any manual markup, so suitable modifiable temporal sections must be determined through analysis of the music video.

The pre-existing music video 710 consists of a music component 711 and video component 712. The video component consists of a series of segments mvSeg1 through mvSeg7; the prefix "mv" is short for "music video". The segments are separated by cuts 714, and transitions such as wipes 715 and dissolves 713.

By analyzing the music component 711 and video component 712 of the pre-existing music video, and combining the resultant descriptors (as discussed earlier), we can identify suitable temporal boundaries for the modifiable sections. In this example, there are four modifiable sections, whose temporal boundaries correspond to shot boundaries in the pre-existing music video.

The first and third modifiable sections of the pre-existing music video are selected for modification. In this case, only replacement by cut is used: in the output production, selected modifiable sections are replaced with user media.

The user input media consists of two video files, labeled "User video 1" and "User video 2". In the output production, the first modifiable section is replaced with material user material sSeg1 741 and sSeg2. In the output production, the segments overlap, and the dissolve transition between them 731 is timed such that it begins on a cut hint. The third modifiable section 733 is replaced with material sSeg3 from "User video 2". Note that not all user video gets used; some user video does not appear in the output production 742.

Use of Part of Pre-Existing Music Video or Multiple Pre-Existing Music Videos

For simplicity, in the above description the new music video is assumed to be the same duration as the single pre-existing music video from which it is derived. More generally, however, with straightforward modifications, the above methods could be used to make a new music video from a portion of a pre-existing video.

Of particular relevance is the case where a user is making a video ringtone for a mobile phone from a pre-existing music video. Ringtones based on popular songs—including video ringtones—generally only use an excerpt of a song.

Typically the most suitable excerpt is that portion of the song which is most catchy or recognizable, which for most songs is the "chorus". It's therefore highly desirable to use the above methods to create new music videos based only on an excerpt of a pre-existing music video, for example, the chorus.

The above methods could also be extended, again with straightforward modifications, to allow the creation of a new music video from the concatenation of several pre-existing music videos, or the concatenation of excerpts thereof.

Types of Computers and Division of Tasks Among Multiple Computers

The above methods can be implemented on a variety of types of computers, with all steps performed on a single computer, or with different steps performed on different computers. Following are examples of a few examples of how the steps could be divided among several computers.

In all the scenarios described below, a style author first authors a style using a pre-existing music video. The authoring includes the various steps described earlier, such as annotation of the pre-existing music video, specification of modification types for the modifiable temporal sections, specification of additional effects & transitions, etc. In a typical case, the style author would use tools running on a personal computer (desktop or laptop) to assist in the authoring process. The authored styled is then deployed in any one of several ways.

Personal Computer. The style, and a software program that uses it, is installed on a personal computer. Via a user interface in that software, the user selects media files on the computer's hard-drive or other mass-storage device, chooses the style, and initiates the steps of creating a new music video. The program then creates an EDL for the new music video. That EDL can either be played in real-time to generate a series of video frames for a real-time preview, or rendered to a video file.

Portable devices. The style, and a software program that uses it, could be installed on various other computing devices, including portable devices such as mobile phones, personal digital assistants, digital style camera, or portable music playing devices such as the iPod. The software could otherwise function in the same way as in the Personal Computer scenario described above.

Server-Based Scenario. The style is deployed on a server that implements a music video making service accessible through a computer network, for example the internet. An end-user uploads visual data from his or her computing device (personal computer, mobile phone, PDA, etc.) to the server, typically via a user-interface on a web-page displayed using a web browser application such as Microsoft Internet Explorer. He or she then selects a style (if there is more than one style to choose from on the server), and initiates the process of making a new music video. Software running on the server then executes steps describes above to automatically create the EDL for new music video that incorporates the user's media. The server then renders the EDL into a compressed video file, which the end user downloads and views on his or her computing device.

Server-Based Service with Minimal Media Transfer. In a variation of the server-based scenario, the end-user's media is analyzed on his or her computer. Only descriptors for the media are upload to the server, not the actual media files. Software running on the server uses the user-media descriptors plus the style to generate an EDL for a new music video. The EDL, plus portions of the pre-existing music video that it refers to, are downloaded to the end-user's computer. Software on end-user's computer then plays the EDL, executing the editing instructions in the EDL in real-time to generate a series of video frames. The advantage of this approach is that the amount of data transferred between the server and the end-user's computer is dramatically reduced. In particular, the end-user's media never gets uploaded to the server.

Style Without Pre-Existing Music Video

If the annotation phase is fully automated, it is possible to create a style which is not tied to an particular pre-existing music video. The style specifies the method and parameters for annotating the pre-existing music video, but not the annotation itself, along with rules for applying additional effects and transitions.

With such a style and a software program that uses it, an end-user could take any pre-existing music video (possibly downloaded from a video sharing website or record company website), select his or her own additional visual data, and create a new music video. In such a scenario, the actual annotation and creation phases 110 and 120 would be executed entirely on the end-user's computer.

Another alternative is for the end-user to receive a pre-existing music video and annotation information which specifies which temporal sections which may be modified, but not which type of modification to use or what additional effects to use. In a software program, the user could select the preexisting music video and annotation information, and also specify the modification types to use and selection criteria for additional visual data he supplies. The software program would then create a new music video, according to methods described above.

Although only a single embodiment of the invention has been described above, many modifications are possible within the scope of the invention as defined by the claims.

The invention claimed is:

1. A computerized method for making a new music video from a pre-existing music video, said new music video and pre-existing music video both including a music track and a visual track, said method including:
 a) a first phase including:
  (i) annotating the pre-existing music video by a first user to obtain location data defining the locations of a plurality of temporal sections within the pre-existing music video, and
  (ii) associating a respective modification priority value with each of said plurality of temporal sections; and
 b) a second phase in which the new music video is created by:
  (i) a second user indicating a collection of additional visual data,
  (ii) for at least one of said temporal sections of the pre-existing music video, automatically selecting at least one respective element from the indicated collection of additional visual data,
  (iii) automatically selecting at least one of said plurality of temporal sections based on the respective modification priority values of said temporal sections and automatically modifying the visual track of said at least one of said plurality of temporal sections of the pre-existing music video using the respective at least one selected element from the collection of additional visual data to form at least one modified visual track section; and
  (iv) automatically combining said at least one modified visual track section with other sections of the visual track of the pre-existing music video and the music track of the pre-existing music video to form the new music video, said music track of the new music video being said music track of the pre-existing video, and said visual track of the new music video incorporating said other sections of the visual track of the pre-existing music video, said other sections of the visual track of the pre-existing music video having the same timing with respect to the music track in the new music video as in the pre-existing music-video.

2. A method according to claim 1 in which:
 said first phase of the method further includes the first user deriving, for one or more said temporal sections of the pre-existing music video, a respective set of modification data indicating a type of modification to be made to the respective temporal section, and
in said second phase of the method, said step of modifying said at least one temporal section of the pre-existing music video being performed according to the respective set of modification data.

3. A method according to claim 1 in which in said first phase said first user operates a first computer system, and in said second phase the second user operates a second computer system operationally independent from the first computer system, said location data being transferred between the first computer system and the second computer system following said first phase.

4. A method according to claim 2 in which said sets of modification data are derived by a process including an automatic analysis of said music track of the pre-existing motion video.

5. A method according to claim 2 in which in said first phase of the method, a respective said set of modification data is derived for each said temporal section of the pre-existing music video and for each of a plurality of values of a style parameter, and said second phase of the method includes:

selecting a value for said style parameter, and modifying said at least one temporal section of the pre-existing music video according to the respective set of modification data associated with the selected value of the style parameter.

6. A method according to claim 1 in which said second phase includes analyzing each selected element of the collection of additional visual data, said step of modifying said respective at least one temporal section of the pre-existing music video being performed according to the result of the analysis.

7. A method according to claim 1 in which said set of location data is obtained using an edit decision list describing the pre-existing music video.

8. A method according to claim 1 in which the step of obtaining the location data includes performing an automatic analysis of the music track and/or video track of the pre-existing music video.

9. A method according to claim 1 in which at least one said modification priority value specifies that the respective temporal section must be included among said at least one of said plurality of temporal sections.

10. A method according to claim 1 in which at least one said modification priority value specifies that the respective temporal section must not be included among said at least one of said plurality of temporal sections.

11. A method according to claim 1 in which for each of said plurality of temporal sections the modified priority values are obtained by an automatic analysis of said pre-existing music video.

12. A method according to claim 1 in which said step of automatically modifying the visual track of said at least one of said plurality of temporal sections of the pre-existing music video, comprises replacing the visual track of said at least one of said plurality of temporal sections of the pre-existing music video with the respective at least one selected element from the collection of additional visual data.

13. A method according to claim 1 in which said step of automatically modifying the visual track of said at least one of said plurality of temporal sections of the pre-existing music video, comprises combining the visual track of said at least one of said plurality of temporal sections of the pre-existing music video with the respective at least one selected element from the collection of additional visual data.

14. A method according to claim 1 in which said step of automatically selecting, for at least one of said temporal sections of the pre-existing music video, at least one respective element from the indicated collection of additional visual data includes:

(i) determining shot boundaries in the indicated collection of additional visual data, and (ii) selecting the element from the indicated collection of additional visual data based on said shot boundaries.

15. A method according to claim 1 in which said step of automatically selecting, for at least one of said temporal sections of the pre-existing music video, at least one respective element from the indicated collection of additional visual data includes:

(i) deriving one or more descriptor values for the indicated collection of additional visual data, and (ii) selecting the element from the indicated collection of additional visual data based on said one or more descriptor values.

16. A method according to claim 15 in which said element is selected according to a similarity criterion between said one or more derived descriptor values and one or more respective descriptor values for the visual track of the respective temporal section of the pre-existing music video.

17. A method according to claim 15 in which said element is selected according to a similarity criterion between said derived descriptor values and one or more descriptor value targets of the respective temporal section, said one or more descriptor value targets having been derived in said first phase.

18. A method according to claim 1 in which said modified visual track section incorporates at least one visual effect pertaining to the respective section of the visual track of the pre-existing music video.

19. A method according to claim 18 in which the visual effect is a slow motion or fast motion effect.

20. A method according to claim 1 in which said first phase includes specifying a respective speed value for one or more of said temporal sections, and each said modified visual track section has a slow motion or fast motion according to the respective specified speed value.

21. A method according to claim 1 in which a visual effect is applied to the whole of the new music video.

22. A method according to claim 1 in which the new music video includes at least one visual effect at a location in the new music video determined according to a feature of the music track.

23. A method according to claim 1 further including transferring the new music video to a portable handphone for use as a video ringtone.

24. A computerized method for making a new music video from a pre-existing music video, said new music video and pre-existing music video both including a music track and a visual track, said method including:

a) a first phase including:

(i) annotating the pre-existing music video by:

(1) obtaining location data defining the locations of a plurality of temporal sections within the pre-existing music video, and (2) deriving, for one or more said temporal sections of the pre-existing music video, a respective set of modification data indicating a type of modification to be made to the respective temporal section; and (ii) associating a respective modification priority value with each of said plurality of temporal sections; and b) a second phase in which the new music video is created by a process comprising:

(i) a user indicating a collection of additional visual data, (ii) for at least one of said temporal sections of the pre-existing music video, automatically selecting at least one respective element from the collection of additional visual data, (iii) automatically selecting at least one of said plurality of temporal sections based on the respective modification priority values of said temporal sections and automatically modifying the visual track of said at least one temporal section of the pre-existing music video according to the respective set of modification data using the respective at least one selected element from the collection of additional visual data to form at least one modified visual track section; and (iv) automatically combining said at least one modified visual track section with other sections of the visual track of the pre-existing music video and the music track of the pre-existing music video to form the new music video, said music track of the new music video being said music track of the pre-existing video, and said visual track of the new music video incorporating said other sections of the visual track of the pre-existing music video, said other sections of the visual track of the pre-existing music video having the same timing with respect to the music track in the new music video as in the pre-existing music-video.

25. A method according to claim 24 in which said sets of modification data are derived by a process including an automatic analysis of said music track of the pre-existing motion video.

26. A method according to claim 24 in which in said first phase of the method, a respective said set of modification data is derived for each said temporal section of the pre-existing music video and for each of a plurality of values of a style parameter, and said second phase of the method includes:

selecting a value for said style parameter, and modifying said at least one temporal section of the pre-existing music video according to the respective set of modification data associated with the selected value of the style parameter.

27. A method according to claim 24 in which said second phase includes analyzing each selected element of the collection of additional visual data, said step of modifying said respective at least one temporal section of the pre-existing music video being performed according to the result of the analysis.

28. A method according to claim 24 in which said set of location data is obtained using an edit decision list describing the pre-existing music video.

29. A method according to claim 24 in which the step of obtaining the location data includes performing an automatic analysis of the music track and/or video track of the pre-existing music video.

30. A method according to claim 24 in which at least one said modification priority value specifies that the respective temporal section must be included among said at least one of said plurality of temporal sections.

31. A method according to claim 24 in which at least one said modification priority value specifies that the respective temporal section must not be included among said at least one of said plurality of temporal sections.

32. A method according to claim 24 in which for each of said plurality of temporal sections the modified priority values are obtained by an automatic analysis of said pre-existing music video.

33. A method according to claim 24 in which said step of automatically modifying the visual track of said at least one of said plurality of temporal sections of the pre-existing music video, comprises replacing the visual track of said at least one of said plurality of temporal sections of the pre-existing music video with the respective at least one selected element from the collection of additional visual data.

34. A method according to claim 24 in which said step of automatically modifying the visual track of said at least one of said plurality of temporal sections of the pre-existing music video, comprises combining the visual track of said at least one of said plurality of temporal sections of the pre-existing music video with the respective at least one selected element from the collection of additional visual data.

35. A method according to claim 24 in which said step of automatically selecting, for at least one of said temporal sections of the pre-existing music video, at least one respective element from the indicated collection of additional visual data includes:

(i) determining shot boundaries in the indicated collection of additional visual data, and (ii) selecting the element from the indicated collection of additional visual data based on said shot boundaries.

36. A method according to claim 24 in which said step of automatically selecting, for at least one of said temporal sections of the pre-existing music video, at least one respective element from the indicated collection of additional visual data includes:

(i) deriving one or more descriptor values for the indicated collection of additional visual data, and (ii) selecting the element from the indicated collection of additional visual data based on said one or more descriptor values.

37. A method according to claim 36 in which said element is selected according to a similarity criterion between said one or more derived descriptor values and one or more respective descriptor values for the visual track of the respective temporal section of the pre-existing music video.

38. A method according to claim 36 in which said element is selected according to a similarity criterion between said derived descriptor values and one or more descriptor value targets of the respective temporal section, said one or more descriptor value targets having been derived in said first phase.

39. A method according to claim 24 in which said modified visual track section incorporates at least one visual effect pertaining to the respective section of the visual track of the pre-existing music video.

40. A method according to claim 39 in which the visual effect is a slow motion or fast motion effect.

41. A method according to claim 40 in which said first phase includes specifying a respective speed value for one or more of said temporal sections, and each said modified visual track section has a slow motion or fast motion according to the respective specified speed value.

42. A method according to claim 24 in which a visual effect is applied to the whole of the new music video.

43. A method according to claim 24 in which the new music video includes at least one visual effect at a location in the new music video determined according to a feature of the music track.

44. A method according to claim 24 further including transferring the new music video to a portable handphone for use as a video ringtone.

* * * * *